Oct. 13, 1970                S. M. BAGNO                3,534,356
                          STRESS ALARM SYSTEM
Filed Dec. 5, 1966                                    3 Sheets-Sheet 1
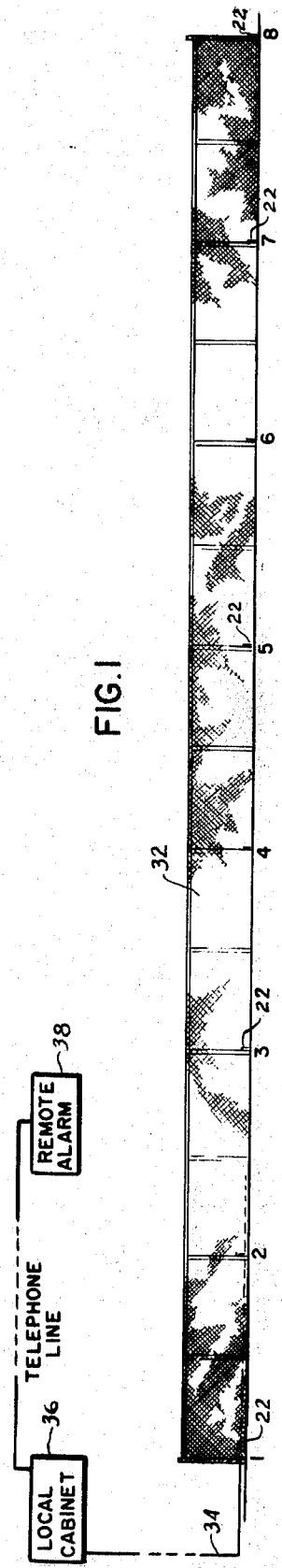
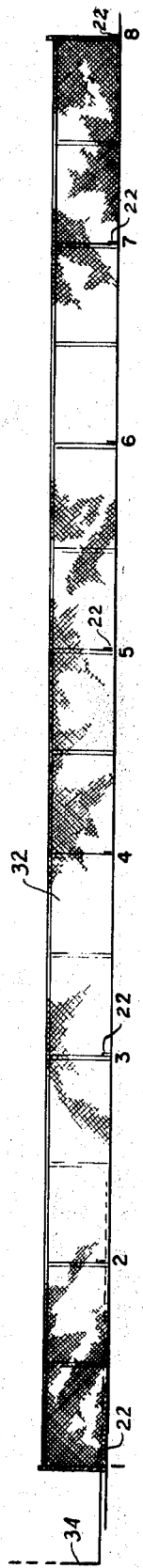
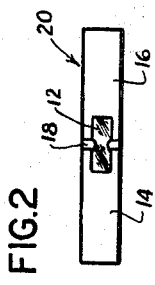
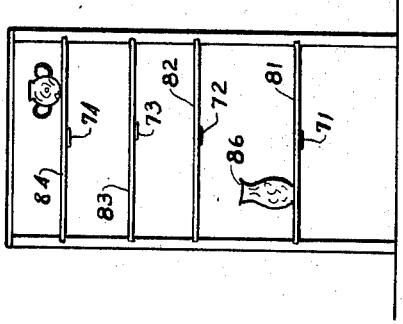
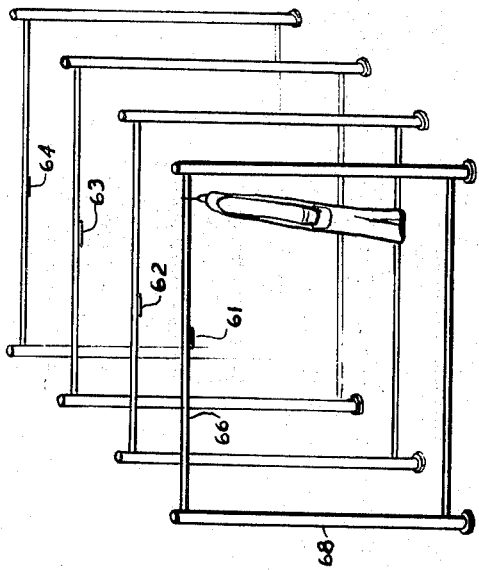
*INVENTOR.*
SAMUEL M. BAGNO
BY *James and Franklin*
ATORNEYS

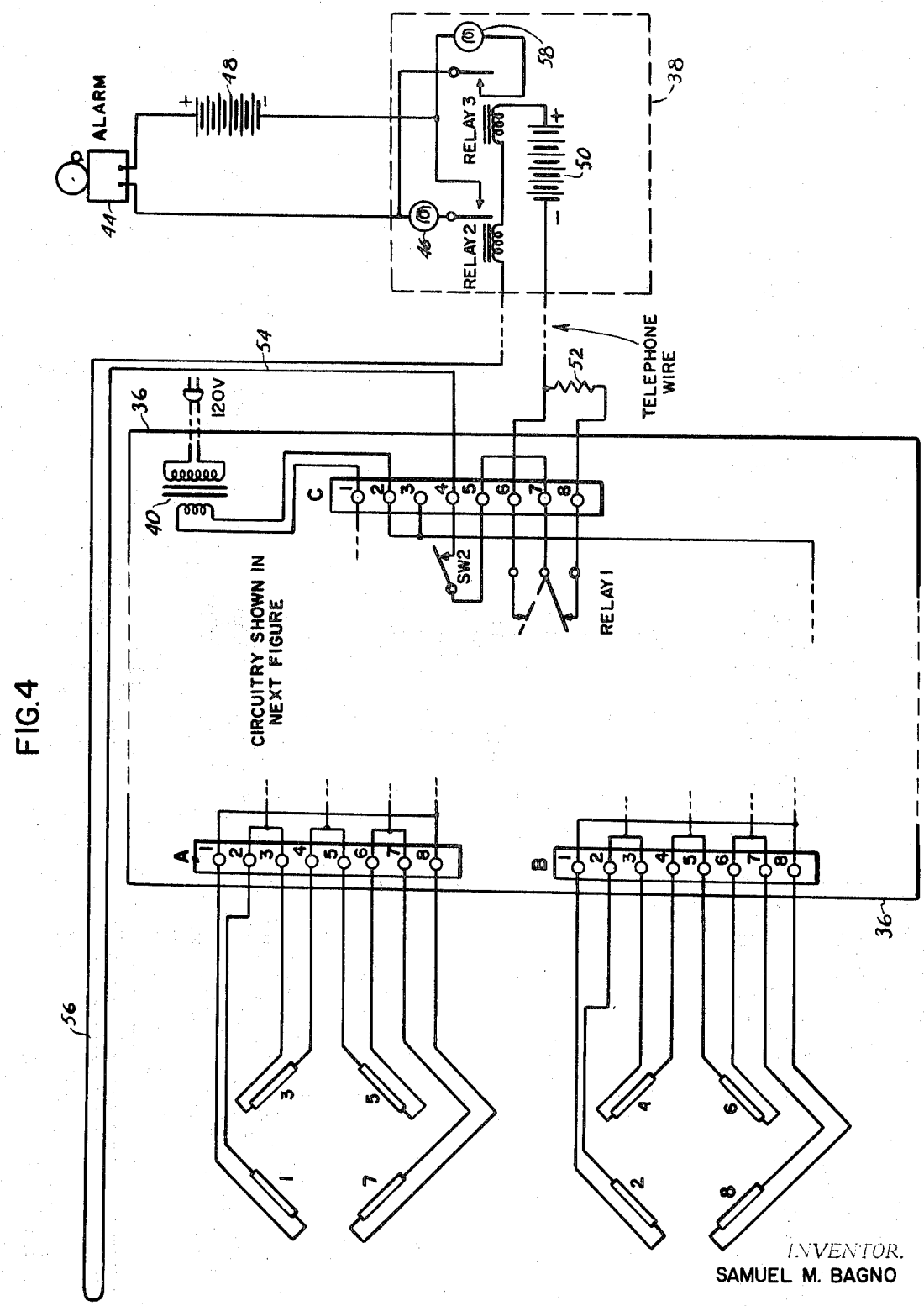

United States Patent Office 3,534,356
Patented Oct. 13, 1970

3,534,356
STRESS ALARM SYSTEM
Samuel M. Bagno, Belleville, N.J.; Goldie Bagno administratrix of the estate of Samuel Bagno, deceased, assignor to Systron-Donner Corporation, Concord, Calif., a corporation of California
Filed Dec. 5, 1966, Ser. No. 599,106
Int. Cl. G08b *13/14, 21/00*
U.S. Cl. 340—272                                    19 Claims

ABSTRACT OF THE DISCLOSURE

Alarm system using strain gauges connected to electronic alarm circuitry and thereby responsive to increased stress caused by the weight of an intruder, as in the case of a fence, a floor beam or roof beam, a fire escape or the like, and also responsive to reduced stress caused by removal of objects from a shelf, clothing rack, or the like.

---

The stress alarm system comprises a strain gauge, preferably a miniature silicon piezo crystal, secured to a structural member which experiences a change of stress upon the happening of an event which is to be guarded against. There is an alarm device, an electric circuit for operating the same, and electronic circuitry connected to and responsive to a change of stress in the strain gauge to cause the electric circuit to operate the alarm device.

The signal from the strain gauge is preferably fed through a capacitor so that the operation depends on rate of change of stress, in order to avoid a false alarm caused by a gradual change such as exposure of the structural member to heat or ice or other such gradual change. On the other hand, the circuitry is made nonresponsive to an audio frequency or vibration of the structural member, by the provision of appropriate filter means. The sensitivity may be reduced to prevent false alarm, as by someone merely leaning against rather than climbing a fence, or the sensitivity may be increased to prevent theft as by someone shoplifting an article from a shelf.

The protected structural members are preferably used in groups of four, the strain gauges being electrically connected to form a bridge which is so connected to the electronic circuitry that unbalance of the bridge provides a signal. In the case of a fence the strain gauges may be secured to spaced posts, usually to alternate posts, and neighboring strain gauges on the fence are not connected to adjacent arms of the bridge, so that someone climbing the fence midway between two strain gauges will nevertheless unbalance the bridge. In one preferred form eight strain gauges are used to form two bridges, and neighboring strain gauges of the fence are connected to different ones of the two bridges.

The electric circuit for operating the alarm device preferably includes normally open underload and overload relays with their coils connected in series and their contacts arranged in parallel and connected to the alarm device. The conductors extending from the strain gauges to the electronic circuitry form part of a cable which includes extra conductors which act as a normally continuous tamper loop, this being in series with the relay coils, so that cutting the cable operates the underload relay. The electronic circuitry is protectively housed in a local cabinet having a door provided with a normally closed tamper switch in series with the relay coils, so that opening the door and tamper switch also actuates the underload relay.

The electronic circuitry preferably includes a plurality of cells forming a battery for emergency power supply in the event of power failure, the said battery being so connected in circuit as to be trickle charged at all times from the power line to maintain the cells in charged condition.

The foregoing and additional features are described in the following detailed specification, which is accompanied by drawings in which:

FIG. 1 is an elevation showing a fence protected against intrusion and embodying features of the invention;

FIG. 2 is a plan view drawn to enlarged scale of a silicon piezo strain gauge used in the alarm system;

FIG. 3 is a view drawn to normal scale showing the said strain gauge mounted on a base for greater convenience when working in the field;

FIG. 4 is an electrical diagram showing strain gauges arranged in bridge formation at the left, and showing the remote alarm circuitry at the right, of a box representative of local electronic circuitry which is shown in the next figure;

FIG. 6 shows how the alarm system may be applied to clothing racks; and

FIG. 7 shows how the alarm system may be applied to shelves.

Figure 5:
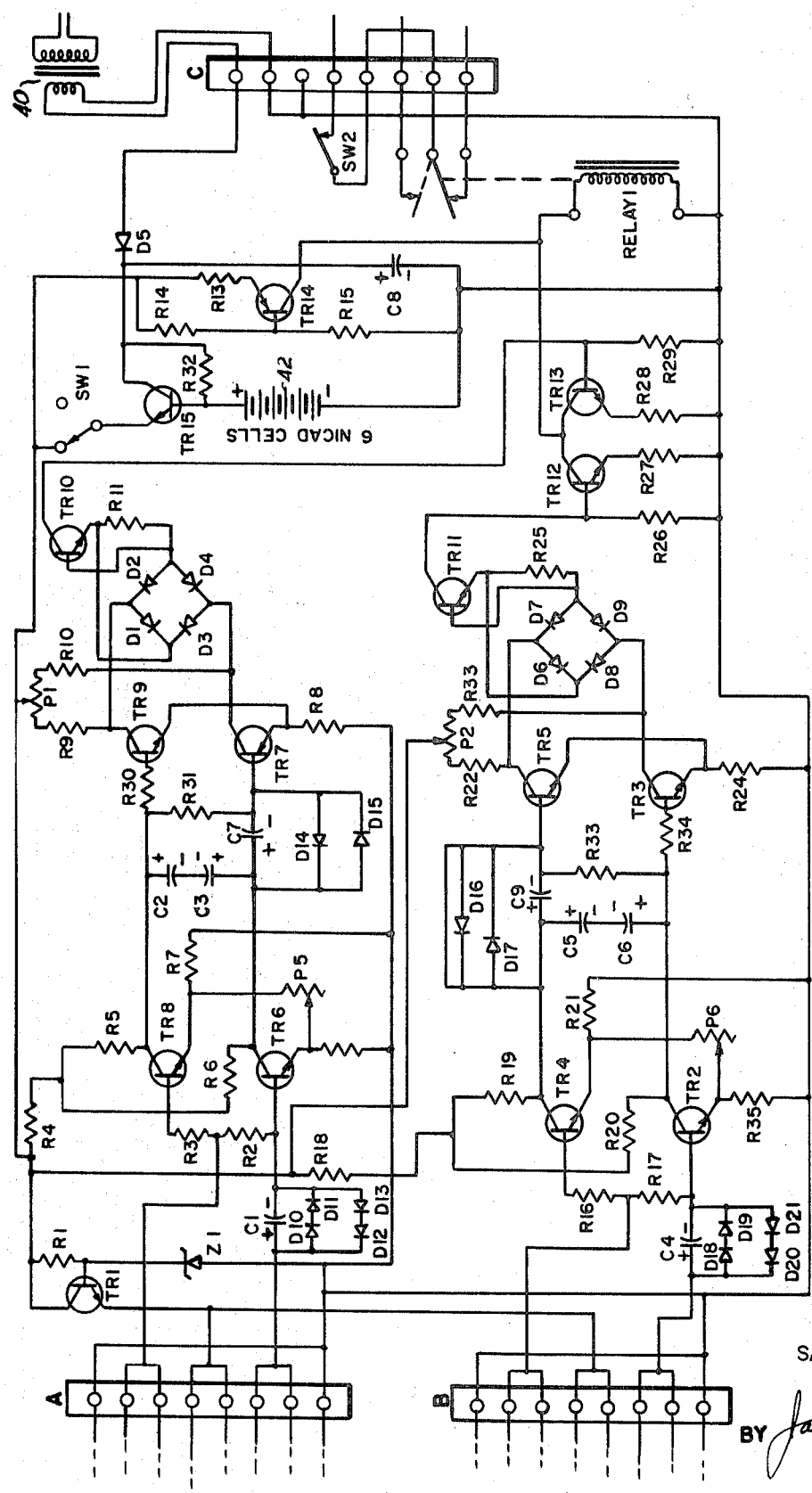
FIG. 5 is an electrical diagram for the components contained in the box at the middle of FIG. 4.

Referring to the drawing, and more particularly to FIG. 2, the strain gauge itself is a silicon piezo resistance strain gauge of a type made by a number of companies. The one illustrated is made by Endevco Laboratories of Mountain View, Calif., under the name "Pixie Transducer." The crystal 12 is necked midway of its length, and the ends are soldered on two separated gold deposits 14 and 16 on an insulating substrate which is exposed at 18. This device, generally designated 20, as sold by Endevco is quite tiny, say 1/16 inch wide and 3/8 inch long, and therefore would be difficult to handle and install in the field. I therefore mount the device 20 on a much larger base, as indicated in FIG. 3. The base conveniently may be printed circuit board material which is conductively coated. This material is cut into pieces 22 which are say 1/4 inch wide and 3 inches long, and the conductive coating is removed at the middle, as by etching, thereby exposing the insulation board at 24. The ends of the strain gauge 20 are soldered to the two separated metallic coatings 26 and 28, for subsequent electrical connection in the field. The middle area is preferably protectively coated with a suitable epoxy compound indicated at 30. The back of the board is preferably coated to make the same opaque, because the crystal is somewhat light sensitive, and it is convenient to use double coated board, instead of coating the back with enamel or the like. The metallic coating on the back then is used merely for opacity, and is not used electrically.

After cementing it to a structural member the strain gauge of FIG. 3 may be covered with vinyl sponge and protected by a metal channel which is adhered by silicone rubber. This is primarily to protect the sensor or strain gauge, and also for temperature insulation. The sensor responds to bending or compression of the post, or any change resulting from stress on the post.

In FIG. 1 the system is shown applied to an ordinary chain link fence, generally designated 32. A sensor 22 like that illustrated in FIG. 3 is secured to every other post, there being eight sensors as indicated by the numerals 1 through 8. The sensors are cemented firmly to the posts near the ground, say six or eight inches from the ground. A multiwire cable extends along the fence with appropriate wires being soldered to each sensor, the said cable then extending as shown at 34 to a local cabinet 36 containing the electronic circuitry, and thence by means of a telephone line to the remote relays for actuating the alarm device, as later described, this being represented by the box 38. (In FIG. 1 there are only fourteen fence sections, instead of sixteen, because an open ended piece of fence is shown, instead of a closed fence.)

Referring now to FIG. 4, the sensors, which are secured to the fence posts are shown at the left of the box 36, and are divided into two groups of four each arranged in bridge formation. It should be noted that alternate sensors are used in the upper bridge, and the intermediate sensors in the lower bridge. The bridge arrangement will be clear if the wires are traced back to the terminal boards A and B, it being seen that terminals 2 and 3 are joined, thereby connecting sensors 1 and 3 at the upper corner of the bridge; terminals 4 and 5 are joined, thereby connecting sensors 3 and 5 at the right corner of the bridge; terminals 6 and 7 are joined, thereby connecting sensors 5 and 7 at the bottom of the bridge; and terminals 1 and 8 are joined, thereby connecting sensors 1 and 7 at the left corner of the bridge. Similar description applies to the lower bridge with reference to the even numbered sensors 2, 4, 6 and 8. The sensors are preferably alternated between the upper and lower bridges, as shown, so that someone climbing a fence midway between two sensors will unbalance both bridges. For the same reason, if in a particular installation there is only one bridge, or if for some other reason neighboring sensors are connected to one bridge, the neighboring sensors are not connected to adjacent arms of the bridge.

If desired each leg of the bridge may have two sensors connected in series, in which case the circuitry shown would be used, generally speaking, with thirty-two rather than sixteen fence sections.

The circuitry in box 36 is shown in detail in FIG. 5, in which the terminal strips A and B at the left correspond to those shown in FIG. 4, and are similarly connected to eight sensors forming four bridges. In the arrangement here shown the bridge is energized between the left and right corners, and an unbalance provides a signal between the top and bottom corners of the bridge, as the bridge is shown in FIG. 4. To regulate the voltage supplied to the bridge I provide a Zener diode Z1 which behaves like a gas-filled tube, that is, there is no conduction up to a certain voltage, and then the diode becomes a very good conductor. It serves as a voltage regulator to regulate the voltage supplied to the base of a transistor TR1. The emitter of TR1 follows the base voltage, and thus regulates the supply voltage which is applied to the two bridges in parallel by way of terminals 4 and 5 (FIG. 4) for the right corner of the bridge, and terminals 1 and 8 for the left corner of the bridge.

The signal provided by unbalance of the bridge is amplified in a two-stage push-pull amplifier, the first stage embodying transistors TR6 and TR8, and the second stage embodying transistors TR7 and TR9. The signal is fed through a capacitor C1 so that it responds to a rate of change. This is done because a very slow change may be caused by heating or cooling as the sun rises or sets, or by building up of ice in winter, and this will cause no response when, as here, the signal is supplied through a capacitor. However, a change occurring within a desired time limit, say twenty seconds, will cause a response.

Capacitor C7 in the input to the second stage of the amplifier serves the same purpose as the capacitor C1 for the first stage. The signal through these capacitors may be brief, but the relays, as later described, are locking relays, and therefore the alarm remains on continuously until the relays are manually reset.

The capacitors C2 and C3, connected in series and located between the first and second stages of the amplifier, act as a filter to shunt out and thereby eliminate audio frequency vibrations. The lower limit is say one cycle per second. Thus, something may shake or vibrate the fence without causing an alarm, but if someone tries to climb the fence the alarm is sounded.

The output of the second stage of the amplifier is applied to a diode bridge comprising the diodes D1, D2, D3 and D4. The purpose of this is to provide a forward pulse to make the transistor TR10 conducting, regardless of whether the signal pulse is a negative or a positive pulse supplied from the bridge. Any unbalance of the bridge causes an alarm, regardless of the direction of the unbalance.

The power supply uses a step-down transformer 40 to drop an ordinary 120 volt AC supply down to 12 volts. This is rectified by means of a diode D5. A single wave rectifier is sufficient, although full wave rectification could be used. The capacitor C8 acts as a filter capacitor, and additional filtering is provided by the transistor TR15 cooperating with a battery 42. This comprises nickel cadmium cells acting as an 8 volt supply. The "Nicad" battery is intended primarily for power supply in case of power line failure, either accidentally or because an intruder first cuts the power supply. The battery avoids a false alarm in case of a temporary power line failure. In addition, the battery 42 acts as a voltage regulator. It remains charged because the circuitry is such as to provide a continuous trickle charge to the battery from the regular power supply. Switch SW1 turns the alarm on and off, but without interrupting the desired trickle charge of the battery. The described DC supply serves for both the upper and lower amplifiers, and for both the upper and lower sensor bridges.

Relay 1 is normally energized by means of a holding current supplied from the main power supply through a transistor TR14. Transistor TR14 is provided with a constant bias, as set by resistors R13, R14 and R15, and therefore delivers a constant collector current. When the relay coil is shorted by either transistor TR12 or TR13, the constant current from transistor TR14 is diverted away from the relay coil, which causes the relay to drop out, thus causing its armature to move from the solid line position and the lower contact, to the broken line position and the upper contact.

Normally transistor TR13 is non-conducting, and the same applies to its companion transistor TR12 which serves the same purpose for the lower amplifier and sensor bridge. The output of transistor TR10 generates a potential between the base and the emitter of transistor TR13 and makes the latter highly conducting, the signal by this time having been greatly amplified by the two stage amplifier. Transistor TR13 then effectively shunts or short circuits the coil of Relay 1, and so causes the relay to drop out. Either transistor 12 or transistor 13 alone, or both transistors together, when made conductive will cause Relay 1 to drop out.

The lower amplifier is the same as the upper, and requires no detailed description, the rate of change capacitors C4 and C9 in the lower amplifier corresponding to capacitors C1 and C7 in the upper; the first stage transistors TR2 and TR4 in the lower amplifier corresponding to TR6 and TR8 in the upper; the shunt capacitors C5 and C6 in the lower amplifier corresponding to C2 and C3 in the upper; the second stage transistors TR3 and TR5 in the lower amplifier corresponding to TR7 and TR9 in the upper; the diode bridge D6–D9 in the lower amplifier corresponding to the diode bridge D1–D4 in the upper; and transistors TR11 and TR12 in the lower amplifier corresponding to transistors TR10 and TR13 in the upper.

In the upper amplifier two oppositely phased diodes D14 and D15 are connected around the capacitor C7 and serve to transmit a signal which may be steady but substantial in amount. The diodes are silicon diodes which have the property of being non-conductive up to say 0.6 volt, and then they become conductive on a rapidly rising curve. When the sensor bridge is near balance, a low voltage signal must go through capacitor C7, If, however, a sensor wire breaks or for any reason there is a high voltage supplied to the diodes, they become conductive and cause an alarm.

The diodes D12 through D13 are connected around the capacitor C1 preceding the first stage of the amplifier, and serve the same purpose. The only difference is that with two diodes used in series as shown, the response voltage will be about 1.2 volts instead of 0.6 volt.

The diodes D18 through D21 in the lower amplifier correspond to diodes D10 through D13 in the upper, and diodes D16 and D17 in the lower amplifier correspond to diodes D14 and D15 in the upper.

The potentiometer P1 in the upper amplifier serves to balance the two sides of the upper push-pull amplifier, and the corresponding potentiometer P2 serves to balance the two sides of the lower push pull amplifier.

The potentiometer P5 in the upper amplifier (and the corresponding potentiometer P6 in the lower amplifier) serves as a sensitivity control, and determines the force on the sensor to which the alarm will respond. Thus, in the case of a fence as shown in FIG. 1, the sensitivity may be set so that someone merely leaning against the fence will not cause an alarm, but someone climbing the fence will cause an alarm. This adjustment serves as an additional protection against a false alarm arising from wind or ice, etc. On the other hand, when protecting a clothes rack or shelf against shoplifting, the circuitry may be adjusted to respond sensitively to a small reduction in stress.

Reverting now to FIG. 4, the remote alarm device may be conventional. This is a bell or other audible signal shown at 44, or a lamp 46, or preferably both. These may be energized from a battery 48, the circuit being controlled by the contact of a normally open underload relay 2, which is normally energized by a small steady current from a suitable source, here indicated by battery 50 connected through a fixed resistor 52 to limit the current to a small amount which just holds relay 2 open. This relay (and also relays 1 and 3) are preferably of the latching type which must be manually reset. When there is an alarm signal relay 1 lets go, and the opening of its lower contact opens the supply through the coil of relay 2, thus closing the alarm circuit.

It should be noted that the relay circuit includes a long closed loop 54, 56. The cable running along the fence would require eight conductors for a single sensor bridge, or in the present case has sixteen conductors for two sensor bridges, but in practice preferably has two additional conductors, these being the conductors 56 which are joined at the far end and act as a tamper loop. If someone cuts the cable or the tamper loop the underload relay 2 operates and sounds the alarm.

The local circuitry is protectively housed in a cabinet, suggested by rectangle 36 in FIGS. 1 and 4, and the door of this cabinet is provided with a normally closed tamper switch SW2. In FIG. 4 it will be seen that the switch SW2 is in series with the tamper loop, and if the cabinet door is opened the switch is opened, thus actuating Relay 2 and sounding the alarm.

There is another relay 3, the coil of which is connected in series with the coil of relay 2. Relay 3 is an overload relay the contacts of which are normally open. The contacts are connected in series with the alarm device 44. A separate lamp 58 is provided, but this is merely for convenience in showing which relay (if only one) has been closed. When relay 1 lets go its armature moves from the solid line "down" position to the broken line "up" position. During this movement relay 2 operates, and when the armature reaches the upper position, the resistor 52 is by-passed, and greatly increased current flows through the relay coils, thus operating Relay 3. Sounding of the alarm is thus assured through the contacts of both relay 2 and 3. A short circuit in the tamper loop, or in the telephone line leading to the remote alarm, will operate the overload relay 3.

The cabinet 36 with the electronic circuitry and the tamper switch is local, that is, it is located somewhere on the protected premises. The multiwire cable is relatively short and goes only to the cabinet 36. A long simple two-wire line, almost always a telephone line, may extend to a home office, or to a protection agency etc. A local alarm also may be provided in lieu of or in addition to the remote alarm.

The system may be shut down during workdays, and energized only at night and during holidays. If a wire is cut or accidentally broken or shorted during a workday, the alarm will sound when the system is energized at night.

Referring now to FIG. 6, a sensor 61 is shown secured to the bottom of the bar 66 of a clothing rack 68. Four such racks may be provided with additional sensors, as shown at 62, 63 and 64, the four sensors forming a bridge which is connected to circuitry like that previously explained. If there are eight racks, they may be used to form two bridges connected to two amplifiers and circuitry as previously described. For daytime use in a store, the alarm may be simply a lamp, to alert sales personnel to the fact that someone has removed a garment. This may call attention to a true customer or may serve as an alarm against shoplifting. At night an audible alarm and/or a remote alarm may be connected into circuit.

Referring next to FIG. 7, I there show a group of four sensors 71, 72, 73 and 74 secured beneath display shelves 81, 82, 83 and 84. The removal of an article on display, for example the vase 86, will set off the alarm. Here again, for daytime use the alarm may be simply a lamp to call attention to a self-service customer, or to a possible shoplifter. At night an audible alarm and a remote alarm also may be connected into circuit.

It will be understood that sensors similarly may be secured beneath a floor beam to detect an intruder, or beneath a roof beam to detect someone seeking entry by way of the roof, or beneath a fire escape, or beneath a staircase, and so on. For a fire escape the sensor may be cemented to the center of a support beam or landing. Quantitative values of the components in the circuitry of FIG. 5 may be given, but this is solely by way of example, and is not intended to be in limitation of the invention. The transistors 1 through 9, 12, 13 and 15 are GE Type 2N3900. Transistors 10, 11 and 14 are Texas Instruments Type 2N1303. The diodes are silicon diodes. The capacitors C1, C7, C4 and C9 are 1000 mfd. The capacitors C2, C3, C5 and C6 are 300 mfd. Capacitors C8 is 125 mfd. The resistors have the following values:

| | Ohms | | Ohms |
|---|---|---|---|
| R1 | 2.2K | R18 | 5.6K |
| R2 | 4.7K | R19 | 10K |
| R3 | 4.7K | R20 | 10K |
| R4 | 5.6K | R21 | 18K |
| R5 | 10K | R22 | 3.3K |
| R6 | 10K | R23 | 3.3K |
| R7 | 18K | R24 | 5.6K |
| R8 | 5.6K | R25 | 5.6K |
| R9 | 3.3K | R26 | 22K |
| R10 | 3.3K | R27 | 100 |
| R11 | 5.6K | R28 | 100 |
| R12 | 18K | R29 | 22K |
| R13 | 680 | R30 | 10K |
| R14 | 5.6K | R31 | 10K |
| R15 | 12K | R32 | 4.7K |
| R16 | 4.7K | R33 | 10K |
| R17 | 4.7K | R34 | 10K |

The potentiometers P1 and P2 each have a resistance value of 3K ohms, and potentiometers P5 and P6 are each 25K ohms.

It is believed that the construction, operation and method of use of my improved stress alarm, as well as the advantages thereof, will be apparent from the foregoing detailed description. The alarm is useful to protect outdoor fenced storage areas and is not subject to false alarms caused by inclement weather or blowing trash. The alarm system may be used to detect shoplifters removing garments from racks or objects from shelves, or to detect intruders on floors, roofs, staircases, and fire escapes. Wide sensitivity control is available. Frequencies having a rate of change greater than say one cycle per second, or slower than say three cycles per minute, may be filtered out of the system. The arrangement is fail-safe against an open circuit or short circuit as to any sensor, or as to the telephone line, and has tamper protection against cutting of a cable or against opening of the circuitry cabinet. There is a stand-by power supply which guards against intrusion during a power failure, and which avoids false alarm caused by temporary power failure.

I claim:

1. In a security alarm system for detecting movement of an intruder past a barrier such as a fence having supporting posts, a strain gauge means mounted on said posts adjacent their base and having a variable electrical resistance dependent on the stress in said barrier, said stress being subject to change by the intruder contacting the barrier, an alarm means, a source of electrical energy for supplying current to said strain gauge means and to said alarm means, and signal discriminating means connected to said strain gauge means and intermediate said source and said alarm, means for energizing said alarm means device in response to a change in stress due to an intruder contacting said barrier.

2. A security alarm system as in claim 1 wherein said discriminating means includes capacitor means connected in series between said strain gauge means and said alarm means, thereby making the operation of said alarm means dependent on the change of stress in said barrier and preventing operation of the alarm means by gradual changes in the stress in said barrier such as changes caused by thermal expansion of the barrier and accumulation of ice thereon.

3. A security alarm system as in claim 1 wherein said discriminating means includes filter means for making the operation of said alarm means nonresponsive to vibrations above a predetermined frequency in said barrier.

4. A security alarm system as in claim 1 wherein said discriminating means includes an amplifier connected for receiving an input from said strain gauge means and delivering a control signal for operating said alarm means and means for adjusting the gain of said amplifier to permit selective adjustment of the level of change in stress sufficient to cause operation of said alarm means.

5. A security alarm system as in claim 1 wherein said discriminating means and alarm means are adapted for normally receiving operating power from an alternating current source, together with a battery connected for supplying operating power to said discriminating means and alarm means in the event of a failure of said alternating current source, and means connected to said source and to said battery for delivering current from said source to said battery to maintain said battery in a charged condition.

6. A security alarm system as in claim 1 together with a cabinet for protectively housing said discriminating means, said cabinet having a normally closed door provided with a tamper switch connected to said discriminating means in such manner that opening of said door causes operation of said alarm means.

7. A security alarm system as in claim 1 together with normally open underload and overload relays connected intermediate said discriminating means and said alarm means, said relays having operating coils connected in series with the output of said discriminating means and contacts connected to said alarm means in such manner that closing of the contacts of either relay causes operation of the alarm means, whereby said alarm means is adapted to be operated by said overload relay when the current from said discriminating means rises above a first predetermined level and by said underload relay when said current falls below a second predetermined level.

8. A security alarm system as in claim 7 together with electrical conductor means connected in series with the relay coils and forming a normally continuous tamper loop having an electrical resistance such that said current normally lies between the first and second predetermined levels, shorting of said tamper loop causing said current to rise above said first predetermined level and opening of said loop causing said current to fall below said second predetermined level.

9. A security alarm system as in claim 1 wherein said strain gauge means includes a plurality of strain gauges mounted on a plurality of said supporting posts and means electrically connecting said strain gauges into the arms of at least one bridge, said bridge being connected ot said signal discriminating means in such manner that unbalancing of said bridge produces a signal to cause energization of said alarm means.

10. A security alarm system as in claim 9 wherein strain gauges mounted on adjacent posts in the barrier are connected in arms other than opposing arms in the same bridge so that the changes in stress caused by a person climbing the barrier intermediate adjacent strain gauges will not produce offsetting changes in the arms of the bridge.

11. In a security alarm system for detecting removal of an object from a horizontal support member such as a shelf or hanger, strain gauge means mounted on and connected to said support member and having a variable electrical resistance dependent on the stress in said support member, said stress being subject to change by removal of the object from said support member, an alarm means, a source of electrical energy for supplying current to said strain gauge means and to said alarm means, and signal discriminating means connected to said strain gauge means and intermedite said source and said alarm means for energizing said alarm means in response to a change in stress due to removal of the object from said support member.

12. A security alarm system as in claim 11 wherein said strain gauge means includes four strain gauges electrically connected to form a bridge, said bridge being connected to said discriminating means in such manner that unbalancing of said bridge produces a signal for causing operation of said alarm means.

13. A security alarm system as in claim 11 wherein said discriminating means includes capacitor means connected in series between said strain gauge means and said alarm means, thereby making the operation of said alarm means dependent upon the change of stress in said support member and preventing operation of the alarm means by gradual changes in the stress in said member such as changes caused by thermal expansion of the member.

14. A security alarm system as in claim 11 wherein said discriminating means includes filter means for making the operation of said alarm means nonresponsive to vibrations above a predetermined frequency in said support member.

15. A security alarm system as in claim 11 wherein said discriminating means includes an amplifier connected for receiving an input from said strain gauge means and delivering a control signal for operating said alarm means and means for adjusting the gain of said amplifier to permit selective adjustment of the level of change in stress sufficient to cause operation of said alarm means.

16. A security alarm system as in claim 11 wherein said discriminating means and alarm means are adapted for normally receiving operating power from an alternating current source, together with a battery connected for supplying operating power to said discriminating means and alarm means in the event of a failure of said alternating current source, and means connected to said source and to said battery for delivering current from said source to said battery to maintain said battery in a charged condition.

17. A security alarm system as in claim 11 together with a cabinet for protectively housing said discriminating means, said cabinet having a normally closed door provided with a tamper switch connected to said discriminating means in such manner that opening of said door causes operation of said alarm means.

18. A security alarm system as in claim 11 together with normally open underload and overload relays connected intermediate said discriminating means and said alarm means, said relays having operating coils connected in series with the output of said discriminating means and contacts connected to said alarm means in such manner that closing of the contacts of either relay causes operation of the alarm means, whereby said alarm means is adapted to be operated by said overload relay when the current from said discriminating means rises above a first predetermined level and by said underload relay when said current falls below a second predetermined level.

19. A security alarm system as in claim 18 together with electrical conductor means connected in series with the relay coils and forming a normally continuous tamper loop having an electrical resistance such that said current normally lies between the first and second predetermined levels, shorting of said tamper loop causing said current to rise above said first predetermined levl and opening of said loop causing said current to fall below said second predetermined level.

References Cited

UNITED STATES PATENTS

| | | | |
|---|---|---|---|
| 3,090,226 | 5/1963 | Corti et al. | 73—141 |
| 3,295,833 | 1/1967 | Everett | 340—272 |
| 3,325,799 | 6/1967 | Farris | 340—272 |
| 3,444,547 | 5/1969 | Surek | 340—280 |
| 1,208,007 | 12/1916 | Reynolds | 340—280 |
| 2,345,771 | 4/1944 | Reynolds | 340—254 |
| 2,408,051 | 9/1946 | Donelian | 340—237 |
| 3,009,056 | 11/1961 | Bone et al. | |
| 3,041,594 | 6/1962 | Charles | 340—280 |
| 3,138,792 | 6/1964 | Jenkins et al. | 340—276 |
| 3,167,668 | 1/1965 | Nesh | 340—10 |
| 3,274,402 | 9/1966 | Crocker | 307—119 |
| 3,354,703 | 11/1967 | Russell et al. | 73—88.5 |
| 3,425,050 | 1/1969 | Tellerman et al. | 340—280 |

DONALD J. YUSKO, Primary Examiner

J. M. BOBBITT, Assistant Examiner

U.S. Cl. X.R.

200—85; 340—276, 280